Feb. 27, 1934.    A. ANDREAS    1,948,742
APPARATUS FOR MANUFACTURING CEMENT AND THE LIKE
Filed Aug. 5, 1930    7 Sheets-Sheet 1

INVENTOR
Arno Andreas
BY
his ATTORNEY

Feb. 27, 1934.  A. ANDREAS  1,948,742
APPARATUS FOR MANUFACTURING CEMENT AND THE LIKE
Filed Aug. 5, 1930  7 Sheets-Sheet 4

INVENTOR
Arno Andreas
BY
his ATTORNEY

Feb. 27, 1934.  A. ANDREAS  1,948,742
APPARATUS FOR MANUFACTURING CEMENT AND THE LIKE
Filed Aug. 5, 1930  7 Sheets-Sheet 7

INVENTOR
Arno Andreas
BY C. F. Goepel
his ATTORNEY

Patented Feb. 27, 1934

1,948,742

UNITED STATES PATENT OFFICE

1,948,742

APPARATUS FOR MANUFACTURING CEMENT AND THE LIKE

Arno Andreas, Munster, Germany

Application August 5, 1930, Serial No. 473,197
In Germany September 2, 1929

16 Claims. (Cl. 222—7)

This invention relates to the manufacturing of cement and characteristically similar materials or substances which are preheated and burned in a kiln, and the invention comprehends an improved means to prevent waste of heat energy and thereby effect considerable economies in fuels.

One of the objects and purposes of the present invention is to cause the material within the kiln and before it enters the clinkering or burning zone to abstract the heat from the hot gases of combustion. To achieve this end a flowing stream of gases is passed through a layer or relatively small bed of raw feed consisting of more or less damp pellets or small bodies. The gases readily give up their heat energy to the small bed of material and according to a particularly important feature of the treatment, the hot particles of dust contained in the gases adhere to the wet or moist pellets. This transfer of the hot dust to the material is of course accompanied by the heat energy contained in the dust. This mode of removing the dust from the stream of hot gases and of transferring the heat energy of the gases to the material which is on its way to be burned, is accomplished within the kiln, in contradistinction to the improvements described and embodied in my companion application, Serial No. 468,513, filed July 17, 1930 in which the result are attained through the agency of apparatus located outside the kiln.

The present invention, involving a transfer of the heat energy inside the kiln and hence to the kiln itself, carries into effect in a different way the mode of treatment illustrated and described in my copending application Serial No. 473,196, filed August 5, 1930, wherein the preliminary drying and calcining of the material takes place in a calcining apparatus arranged in series with the rotary kiln.

In the instant case, the material which is on its way to the calcining zone, is so arranged that it takes up or fills, in the preheating zone or in the calcining zone, the greater part of the cross sectional area of the rotary kiln, the arrangement being such that the hot gases are drawn through the material by an artificial draft. Owing to this arrangement, the kiln must be rendered air-tight or substantially so to avoid the entrance of outside atmosphere, for otherwise the mode of operation will not be entirely effectual.

That part of the rotary kiln where the material is preliminarily treated is so fashioned that the hot gases will rapidly give up much of their heat energy. As heat treating problems vary with different actual conditions encountered in practice, various types of material feeding apparatus can be advantageously employed in conjunction with the rotary kiln in order to make the best use of the gases and abstract the most heat energy therefrom. The material feeding devices by means of which the heat treating problems are effectually solved in practice may consist of an independent drum which may be arranged either for rotation with the kiln or for rotation independently of the kiln, or which may have no movement with respect to the kiln.

It is also within the province of my invention to provide a rotary material feeding drum composed of outer and inner tubes having perforated walls so as to provide cylindrical screens or grills between which the material to be dried and calcined is slowly forwarded, and the arrangement preferably includes a shell which surrounds the upper portion of the outer tube, leaving the lower portion thereof open for the flow of hot gases transversely through the slowly feeding material and into the interior of the inner tube which forms the outlet channel for the used gases.

According to another embodiment of my invention, intended particularly to prevent showering of dust where the raw material is in a dry powdered state, the material feeding parts are so arranged that the stream of inflowing material is inclosed against the escape of dust and will slowly and uniformly feed in a relatively thin and uniform layer for contact with the gases and in such manner that there will be no gaps in the layer through which the gases can pass without giving up their heat.

In addition to the foregoing objects, I provide, as hereinafter set forth, a number of specific improvements of various kinds, the purpose and object of which are to improve the mode of operation and the practical application of my method in general, and of the apparatus or means for carrying it into effect in particular.

The principles of the invention and the preferred modes of carrying the same into effect in a practical way will best be understood by referring to the accompanying drawings, more or less diagrammatical in character, and in which:—

Figure 1:
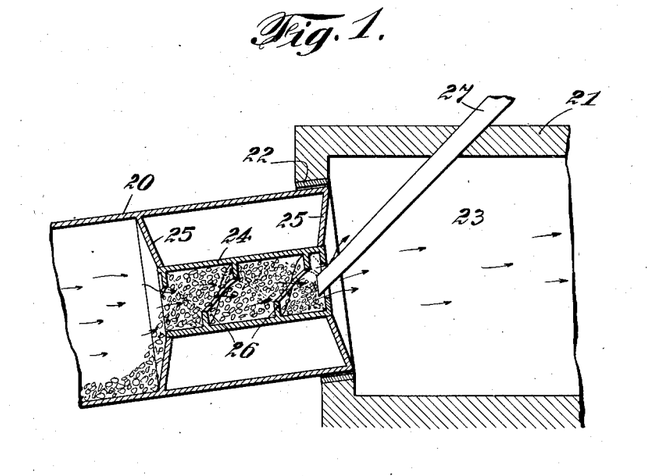
Figure 1 represents a fragmentary longitudinal sectional view showing a feed-heater arranged to rotate with the rotary kiln.

Referring with more particularity to the accompanying drawings and first to the form of construction shown in Fig. 1, 20 denotes a longitudinally inclined rotary kiln of any ordinary or approved type into which the raw material is fed at the elevated end thereof to be advanced slowly through the preheating, calcining and clinkering zones and thence to be discharged in the form of clinkers or the like from the low end of the kiln. In the present embodiment, I have not illustrated the clinkering zone wherein the burner is located for supplying the flame for the burning operations. This feature, however, is well understood in the art. 21 designates a housing which may constitute an independent structure or any convenient part of the furnace brick work or tiling. The elevated or feeding end of the rotary kiln is represented as having turning fit in a bushing 22 in one end of the housing. Within the housing is an outlet channel 23 for the spent gases of combustion. Within the feeding end of the rotary kiln is arranged a drum device 24 which is connected at its opposite ends to the kiln by means of annular walls 25, this arrangement being such that the cross sectional area of the kiln at its feeding end is closed with the exception of the relatively small interior diameter of the drum 24. Manifestly, under this arrangement, the drum 24, which serves as a feed-heater, rotates with the kiln. Suitable screw-like blades 26 are arranged within the interior of the drum, as shown, for advancing the material into the interior of the kiln. 27 represents a feed pipe through which the raw material, preferably in the form of small bodies or pellets, is introduced into the drum. By this arrangement, the gases of combustion from the clinkering zone are caused to pass through the raw material which is slowly fed downwardly through the interior of the drum 24 and into the kiln. The raw material is preferably made moist or wet so that the dust particles contained in the hot gases of combustion will adhere to the small bodies or pellets and so that the heat energy contained in the dust particles will be permanently transferred to the small bodies or pellets comprising the raw material. In addition to this, it will be evident that the gases of combustion in passing through the slowly advancing stream of raw material will give up much of their heat energy thereto. It is in place to state here that the drum 24 may be made conical for use in connection with very wet raw material in order that at least at one place the raw material will entirely fill the cross sectional area of the drum.

Figure 2:
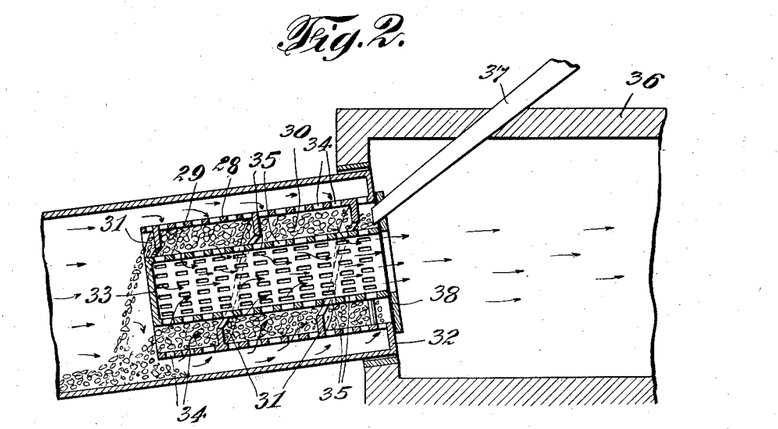
Fig. 2 is a similar view showing a modified construction in which the material is carried forwardly through a circumferential passage in the feed-heater.

In Fig. 2, I show a drum or feed-heater made with double walls 28 and 29 forming an annular downwardly inclined chamber 30 through which the raw material is fed into the kiln. In this annular chamber are arranged suitable screw-like blades 31 for advancing the material into the kiln. This type of drum is represented as associated at its outer end with the end or cover 32 of the kiln. The chamber formed by the inner cylindrical wall 29 is closed at its forward end by an end plate 33, with the result that the gases of combustion are caused to flow around the outer cylindrical wall 28 and thence through the apertures 34 therein to pass through the advancing material and also through the apertures 35 in the inner wall for escape through the inner chamber into the outlet channel of the housing 36. A feed pipe 37 is arranged to supply the raw material to the annular chamber 30. Preferably, as shown, an annular plate or ring 38 may be arranged to close or substantially close the outer end of the chamber 30. Under this construction, it will be seen that the raw material is introduced into the kiln through an annular channel of restricted dimension in cross section and that the hot gases of combustion are controlled so as to pass substantially transversely through the moving material. The feeding is maintained continuously so that there will be no gaps therein to permit the escape of unreclaimed heat energy. It will, of course, be understood by those acquainted with the art that any suitable blower, fan or equivalent apparatus may be provided in any suitable manner for drawing or sucking the gases through the inwardly fed material.

Figure 2A:
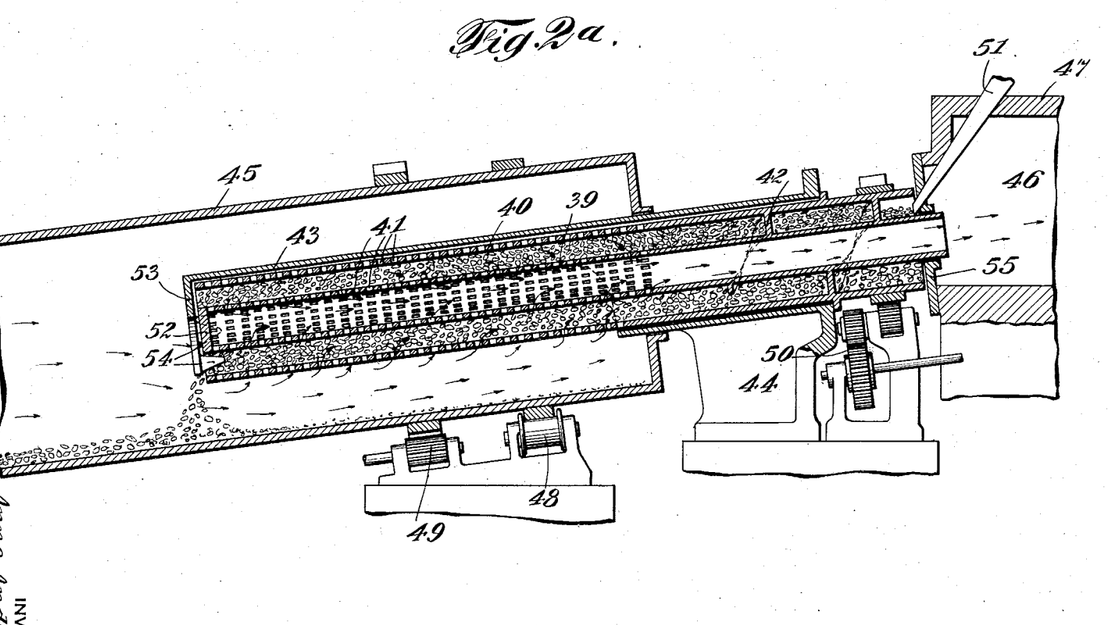
Fig. 2a represents a longitudinal sectional view on a larger scale showing an independently rotated feed drum comprising inner and outer tubes.

In the exemplification shown in Fig. 2a the drum for drying and calcining the raw material consists of two coaxial tubes 39 and 40 which extend for a considerable distance into the kiln and which are provided with perforations 41. These inner and outer perforated walls constitute cylindrical screens or grills between which the material to be dried and calcined is slowly forwarded along the rotary drum by screw propelling means as 42 arranged in proximity to the feeding end of the drum. A further feature of this construction consists in a shell 43 which is supported by the foundation 44 of the kiln 45 and which encloses the upper portion of the outer tube 41, but leaves the under portion of said tube open so that the hot gases of combustion will, at the under-side of the two-part drum, enter through the apertures 41 of the outer and inner tubes 40 and 39 and thence pass outwardly through the inner tube for escape through the outlet channel 46 in the housing 47. The combustion gases are thus caused to pass through the material that is slowly advancing through the annular chamber formed between the inner and outer tubes.

The kiln 45 is supported for turning upon roller bearings as 48 and is revolved by transmission gearing 49 in well-known manner. The feed-heater drum of this construction, comprising the inner and outer tubes 39 and 40, has bearing for rotation in the shell 43 and is revolved, independently of the kiln, through suitable transmission gearing 50 suitably arranged in the foundation for the kiln. As clearly shown in the drawings, the inner and outer tubes are connected by the helical conveying means 42 which seizes the raw material introduced through the feed pipe 51 and operates to advance the seized material forwardly through the annular space between the inner and outer tubes. The inner end of the inner tube 39 is closed by a plate 52, while a crescent-shaped plate 53, which is joined to the shell 43, cooperates with the inner end of the outer tube so as to permit the discharge at the desired rate, of the calcined material from the space between the inner and outer tubes. Said plate 53 is furnished with suitable paddle or shovel devices 54 which extend into the space between the inner and outer tubes and aid in effecting the discharge of the calcined material. At the outer end of the drum, the space between the inner and outer tubes is closed by a cover 55.

In operation, the raw material, which is preferably wet with water, is fed into the space between the inner and outer tubes where it is seized by the helical screws 8 as the drum revolves, so that the introduced material is slowly advanced toward the outlet end of the drum, the material filling the entire annular space between the inner and outer tubes. Arriving at the outlet end of the drum, the preheated or calcined material is paddled or stirred out of the space and falls downwardly into the kiln where it is conveyed in the usual manner to the burning zone. The hot combustion gases from the burning zone enter the perforations of the outer tube from the underside thereof and stream through the material, thence passing through the perforations of the inner tube into the interior thereof for flowing off into the outlet channel 46. The hot combustion gases, thus being forced through the material, lose their heat and reach the outlet channel 46 in approximately a cooled state. In this way practically all the heat energy of the combustion gases is recovered. The raw material, on the other hand, becomes heated to such an extent that it is at least well dried before being discharged into the burning tube of the kiln. As will be manifest, the shell 43 which covers the upper portion of the outer tube, prevents the gases from escaping through the apertures provided throughout the upper portion of the outer tube. The gases being under artificial draft and the inlet 13 always being filled with raw material, the gases cannot escape from the space between the two tubes except through the apertures leading into the interior of the inner tube. This form of construction provides two important advantages: The cylindrical layer of raw material has an equal thickness in every part and under all conditions, and in addition to this the raw material as it is advanced is continuously stirred up so that there is no sticking of the material to the walls of the tubes. Moreover, there is no cohering of the material with itself and the perforations of the tubes are not clogged up.

Figure 3:
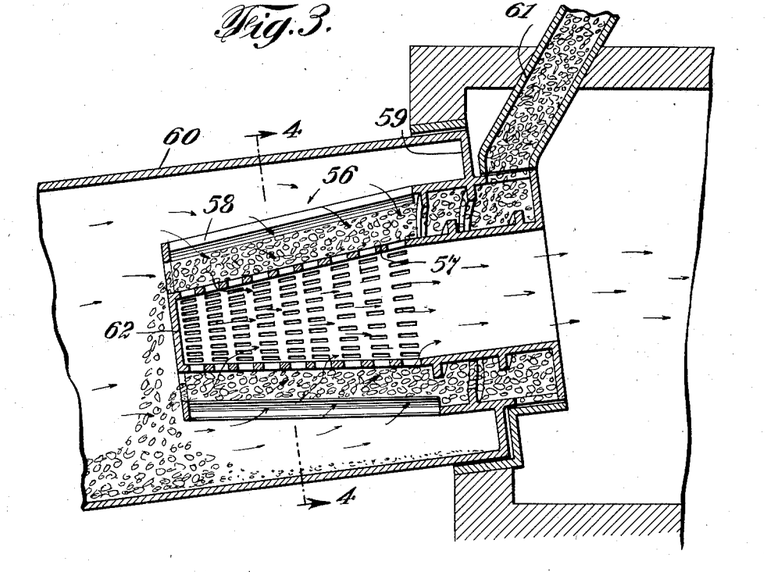
Fig. 3 represents a fragmentary sectional view showing a feed-heater in the form of a cone arranged to rotate with the rotary kiln.
Figure 4:
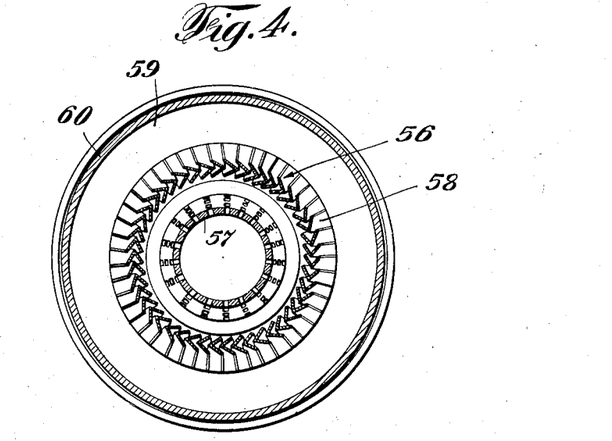
Fig. 4 represents a cross section on the line 4—4 of Fig. 3.

In Figs. 3 and 4, I show a feed-heater in the form of a conical drum 56 having an inner perforated wall 57 and an outer wall 58 made in the form of a grate, said outer wall consisting of a number of suitably arranged angle irons as best shown in Fig. 4. In this form of construction, the drum or feed-heater is joined to the end closure 59 of the rotary kiln 60. The raw material is introduced through a feed tube 61 into the space between the inner wall or tube 57 and the outer cylindrical grate 58, the said cylindrical wall 57 being closed as at 62 at the inner end and being open at its outer end to let out the gases which have passed through the grate structure and through the material into the interior of the inner cylindrical wall 57. The material is discharged through the annular opening 62' which surrounds the plate 62 and, additionally, some of the material will fall through the grate 56 into the kiln for direct delivery thereby into the burning zone.

Figure 5:
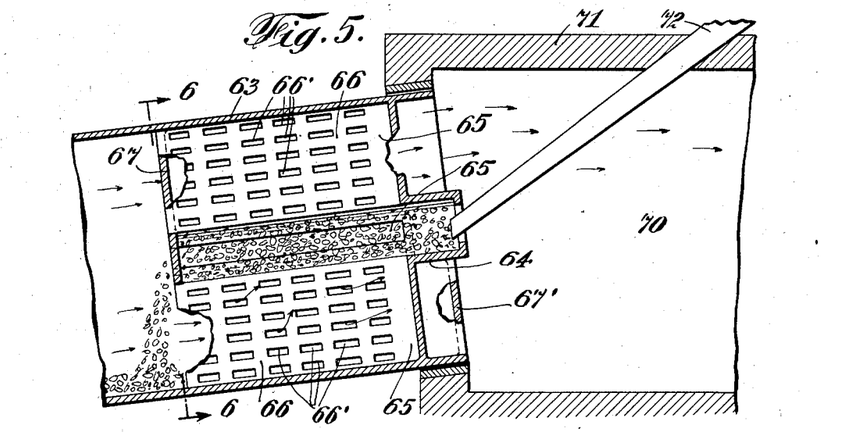
Fig. 5 represents a sectional view through an alternating-channel type of feed-heater.
Figures 6, 7:
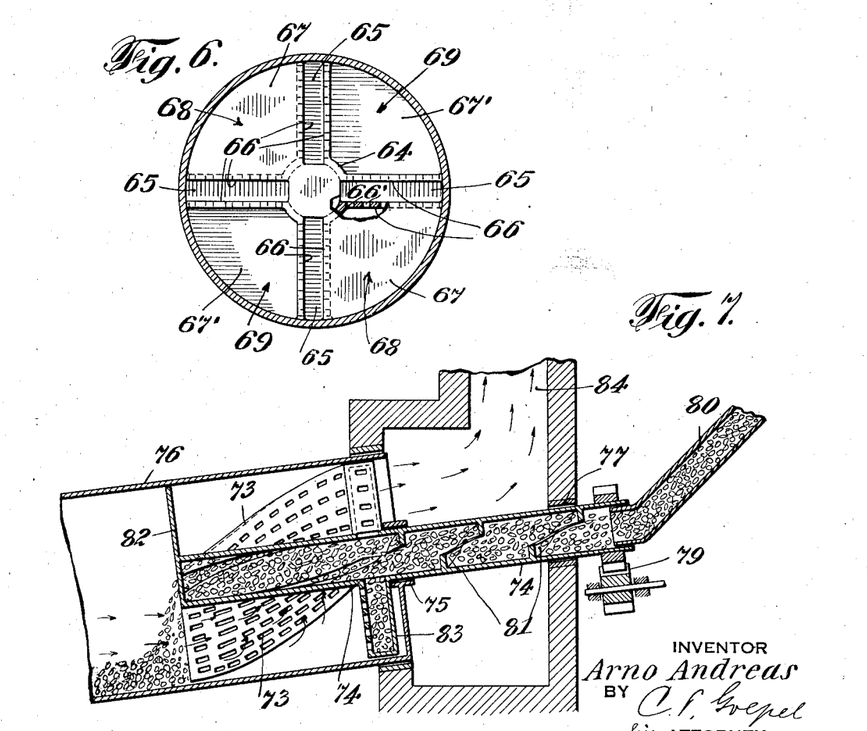
Fig. 6 is a cross section taken on the line 6—6 of Fig. 5.
Fig. 7 represents a modification in which the alternating-channel type of feed-heater is made in the form of curved vanes and is rotated independently of the rotary kiln.

In the exemplification shown in Figs. 5 and 6, the elevated feeding end 63 of the kiln has formed therein to turn therewith a feed-heater construction comprising a central tube 64 with which spaced-apart radial pockets 65 are in communication, said pockets extending to the peripheral wall of the kiln. The walls 66 which define the radial pockets 65 are perforated as at 66'. Between the defining walls of the adjacent pockets are chambers of which, in the present embodiment, two are closed by walls 67 at their front ends, while being open at their rear ends, and two others are open at their front ends and are closed by walls 67' at their rear ends. The two chambers which are closed at their front ends and are open at their rear ends, are indicated by the numerals 68; while the two alternate chambers, which are open at their front ends and closed at the rear ends, are indicated by the numerals 69. The two chambers 69 thus admit the hot gases of combustion for flowing through the material within the radial pockets, while the other two chambers 68 provide outlet passages through which gases stream into the outlet channel 70 of the housing 71. The material is supplied to the central tube through a feed pipe 72. Under this arrangement, the exhaust gases enter through one section, pass through the raw material for calcining the same and leave through another section.

In the form of construction shown in Fig. 7, the feed-heater comprises four material feeding pockets 73, which are shaped like screws, as shown, the same being carried by a central feed-tube 74 which has suitable bearing at 75 in the closed end of the kiln 76 and at 77 in the wall of the housing 78. This feed tube 74 which carries the screw-like feed pockets 73, is rotated independently of the kiln 76, the means by which it is rotated being herein illustrated as consisting of transmission gearing 79. The raw material enters into the feed-tube 74 through a supply tube 80. Within the central feed-tube 74 are arranged suitable screw-like propelling blades 81 for advancing the material. The walls defining the screw-like pockets are perforated and at their front ends the pockets are alternately closed by a wall 82, while at their rear ends they are alternately closed by a wall 83, the alternating arrangement in this regard being similar to that more fully illustrated and described in connection with the construction shown in Figs. 5 and 6. The exhaust gases, therefore, enter through one section, pass through the raw material and leave through another section, finally leaving by the outlet channel 84 of the housing.

Figure 8:
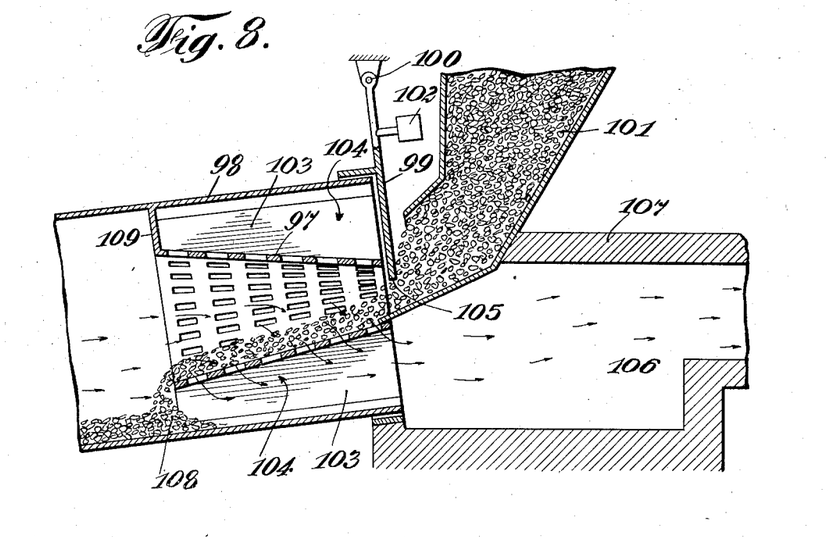
Fig. 8 represents a longitudinal section showing a form of construction in which the feed-heater rotates with the drum and cooperates with a supply hopper so as to admit a limited stream of material.
Figure 9:
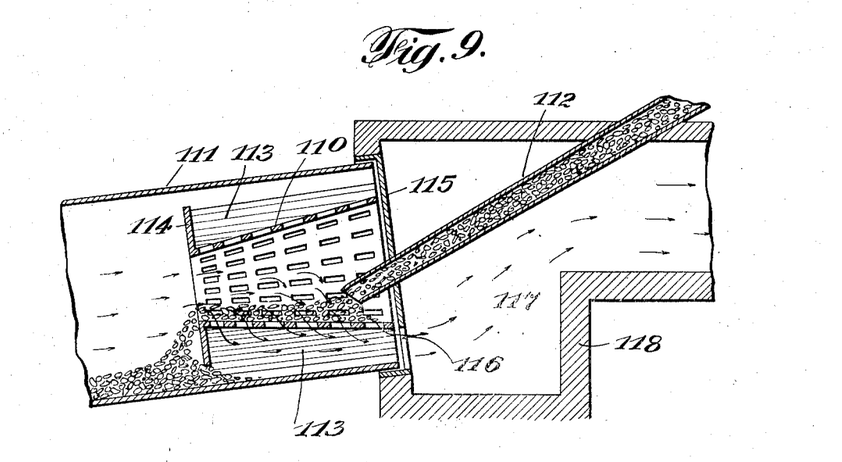
Fig. 9 shows another construction for restricting the inflow of material.

In Fig. 8 I show an embodiment in which a perforated filter drum 97 is placed inside the feeding end of the rotary kiln 98. The feeding end of the rotary kiln is closed by a segment-like cover or flap 99 which is pivotally hinged as at 100 and which is pressed against the kiln by means of the material coming from the feed hopper 101 and also with the assistance of a weight 102. The pivoted segment 99 thus adapts itself to any displacement longitudinally of the kiln during the rotation thereof. The perforated conical sieve drum 97 is held in position by means of radially arranged walls 103 which subdivide the rotary kiln at this zone into a number of separated chambers 104 located around the drum 97. The material feeds from the hopper 101 into the smaller end of the sieve drum through the opening 105 below the flap 99. The exhaust gases enter through the open inner end of the sieve drum, pass through the material feeding forwardly over the lowermost part of said drum and escape through the chambers 104 to flow through the outlet channel 106 in the housing 107. The inner ends of the chambers 104 may be closed at the bottom of the kiln by the material itself as at 108, or, where desired, a radial wall 109 may be connected between the sieve drum and the kiln to close the inner ends of the said chambers. If desired, the conival sieve drum 97 may be produced in the form of a wire net. It may also consist of a construction produced from rods which are connected side by side after the fashion of a grate.

Where pulverulent material is spread, the clouds of dust developed by introducing the same into the kiln may be reduced to a minimum if the material through which the exhaust gases pass is moved slowly and uniformly corresponding to the feeding action of the kiln and the discharge of the feeding layer into the kiln. At the same time, the feeding layer must have a sufficiently large surface in order to be quickly and thoroughly dried and calcined and must not have a gap through which the gases will stream without giving up their heat energy. Moreover, to those familiar with the art, it will be manifest that a thin layer of such material should be in close proximity to the burning zone in order to prevent any loss of the heat energy.

Figure 10:
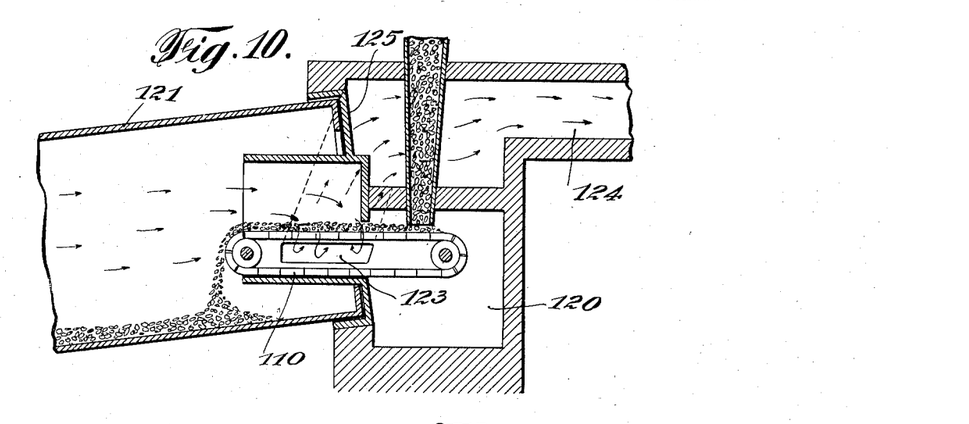
Fig. 10 illustrates a stationary feed-heater equipped with a travel grate for the material.

In Figs. 9 to 12, I show various constructions which are especially adapted for use in feeding and calcining pulverulent material. Referring to Fig. 10, it will be seen that the sieve drum 110 is connected with the rotary drum 111 to rotate therewith. The arrangement illustrated is especially suitable for slowly rotating kilns in which a sieve drum 110 of conical form has a very slow discharge on account of its relatively small diameter. It will be observed that the conical shape of the drum substantially compensates for the inclination of the kiln 111 so that the material which is introduced through a supply tube 112 is advanced slowly into the kiln over a surface which is substantially horizontal. Preferably, as shown, the drum 110 is connected with the kiln by means of a number of radial walls 113 so that the annular space around the drum 110 will be subdivided into separate chambers. Cover plates 114 may be provided at the front ends of these chambers, while a depending cover plate 115 is arranged at the open end of the kiln so as to cover the open end of the drum and the chambers, said cover plate however leaving at the bottom portion of the structure an opening 116 through which the gases can pass from the chambers into the outlet channel 117 of the housing 118. The gases in this instance, enter the small end of the drum and pass through the material on the lowermost part thereof and thus enter the chambers around the drum, for it will, of course, be understood that as the drum rotates with the kiln the material will always be fed forward along the lowermost portion of the rotating drum.

In the form of construction shown in Fig. 10, a traveling grate 119 extends from the housing chamber 120 into the feeding end of the kiln 121. This traveling grate is supplied with raw material through a hopper 122. The exhaust gases from the kiln 121 pass through the layer of material on the grate 119 and leave through a channel 123 which communicates with an outlet channel 124. A cover 125 closes the end of the kiln 121 and encircles the grate 119, thus preventing the exhaust gases from leaving the kiln in any other direction except through the grate and channel 123.

Figure 11:
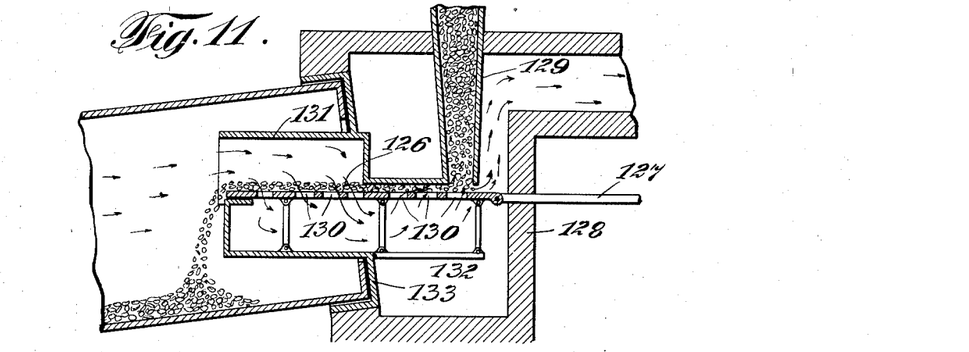
Fig. 11 shows a further modification in which an oscillating channel plate introduces the material in a shallow layer.

In Fig. 11, an oscillating channel plate 126 is arranged to be oscillated by a rod 127 from the outside of the housing 128. The raw material is fed by a hopper 129 onto the oscillating channel plate. The bottom of the channel plate is provided with perforations 130 so that the exhaust gases which enter through the open end of the guide drum 131 will pass downwardly through the material and stream out of the apertures of the channel plate and into the outlet opening 132 in the housing. That portion of the cover which is indicated by the numeral 133 may be equipped with means for collecting any material which falls through the apertures of the channel plate.

Figure 12:
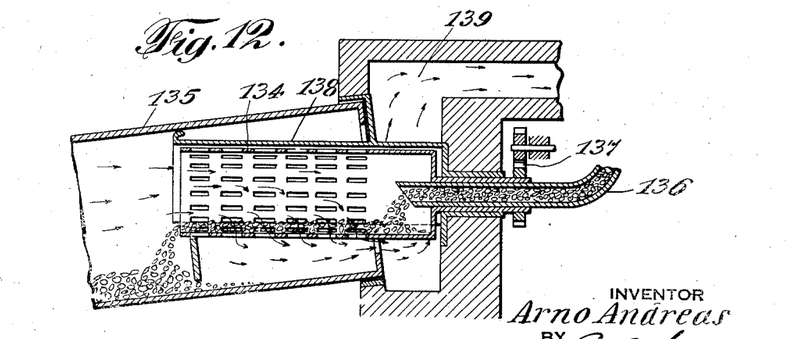
Fig. 12 shows a construction in which a shallow flow of material is introduced through the agency of a filtering drum operated in conjunction with the kiln.

In Fig. 12, a perforated drum 134 is arranged in the feeding end of the kiln 135 so as to receive the material introduced through a feed-tube 136. This perforated drum extends a considerable distance into the kiln and is driven independently of the kiln by means of suitable transmission gearing 137. Surrounding the upper portion of the perforated drum is a covering or shell 138, by means of which the exhaust gases are caused to enter through the inner open end of the perforated drum and to pass downwardly through the material, streaming out through the perforations and escaping through the outlet channel 139.

Figure 13:
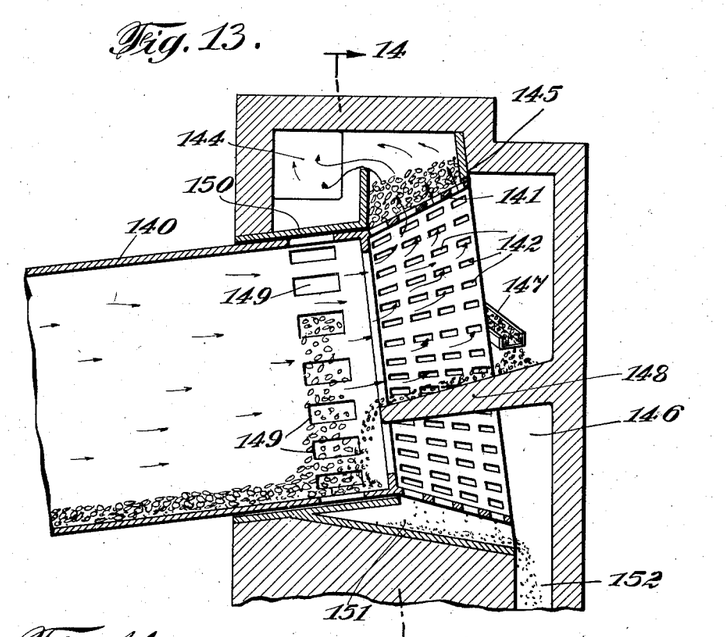
Fig. 13 represents a further modification, showing the end of the kiln made in the form of a filter drum with an outlet for the fine material.
Figure 14:
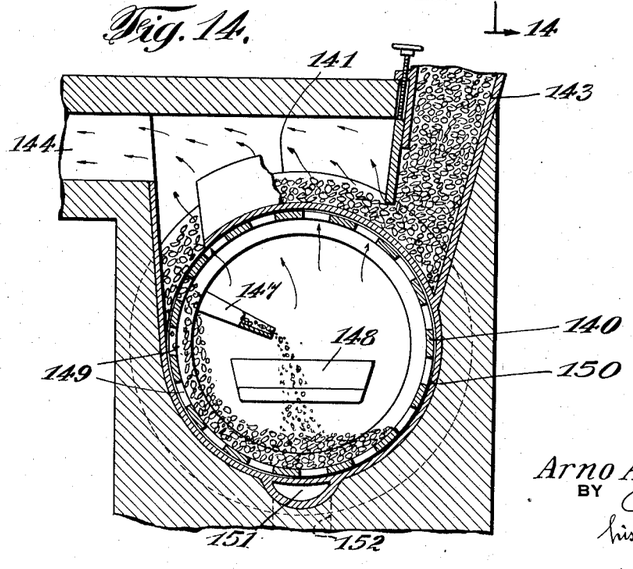
Fig. 14 is a cross section taken on the line 14—14 of Fig. 13.

In the modification shown in Figs. 13 and 14, the feeding end of the rotary kiln 140 is constructed to provide a filter drum by making a conical enlargement 141 which is provided with apertures 142. The material is fed through a feed-tube 143 upon the upper part of the cone-shaped enlargement 141; and the exhaust gases have to pass through the apertures 142 and through said material in order to reach the outlet channel 144, which channel by means of walls 145 is separated from a lower chamber 146. The material carried by the rotating action of the kiln reaches the kiln over the guides 147 and 148, or through the lateral entrance openings 149 in the circumference of the kiln 140. A mantle cover 150 is arranged about that portion of the kiln containing the lateral openings 149, so that at other places neither the exhaust gases nor the incoming material may pass. The fine material which drops through the openings 142 and 149 collects at 151 for discharge into an outlet 152, whence by any suitable means (not shown) it may be returned to be fed again through the feed pipe 56.

While I have illustrated and described my invention as comprising a particular mode of treatment and as taking certain selected forms, it will be understood that changes and alterations may be made in the particular details set forth and in the particular forms of constructions without departing from the spirit of the invention, and hence I do not limit myself to the particular details set forth or to the particular forms of construction, but consider myself at liberty to make such changes and alterations as fairly come within the scope of the appended claims.

1. A rotary kiln apparatus having a feeding end for receiving the material to be conditioned in the kiln and for passing out the exhaust gases of combustion, a feed-heater device in the feeding end, its construction including an inner passage and outer passage, the walls defining said passages having transverse openings therethrough, the outer passage being open at its inner end and adapted to cause material entered therein to be conveyed to said open inner end for delivery into the kiln, said inner passage being closed at its inner end to insure that the exhaust gases will pass through the outer passage and through the material therein by passing through said transverse openings, before reaching the inner passage for discharge thereby from the kiln.

2. In combination with a rotary kiln, a pair of concentric tubes with a passage between them, extending into the kiln through the feeding end thereof, means for feeding material into the passage for movement lengthwise of the passage for delivery inside the kiln, said outer tube having apertures therein inside the kiln to admit the exhaust gases from the interior of the kiln to the moving material, said inner tube being closed at its inner end and having apertures therein for admitting into its interior the exhaust gases passing through the moving material, and said inner tube affording a passageway for the discharge of exhaust gases from the kiln.

3. In combination with a rotary kiln, a pair of concentric tubes with a passage between them, extending into the kiln through the feeding end thereof, means for feeding material into the passage for movement lengthwise of the passage for delivery inside the kiln, said outer tube having apertures therein inside the kiln to admit the exhaust gases from the interior of the kiln to the moving material, said inner tube being closed at its inner end and having apertures therein for admitting into its interior the exhaust gases passing through the moving material, and a closure member between the kiln and outer tube adjacent the outer end of the latter to cause the exhaust gases to enter the apertures of the outer tube.

4. In combination with a rotary kiln, a pair of concentric tubes with a passage between them, extending into the kiln through the feeding end thereof, means for feeding material into said passage, means in said passage for feeding the entered material lengthwise thereof for ultimate delivery inside the kiln, said outer tube, inside the kiln, having apertures to admit exhaust gases from the kiln to the moving material in said passage, said inner tube being closed at its inner end and having apertures through which to admit into its interior the gases after the latter have passed through the moving material, the interior of the inner tube affording a passageway for the discharge of the gases from the kiln, and means constituting a closure between the kiln and outer tube to cause the gases to enter the apertures of the outer tube.

5. A rotary kiln apparatus having a feeding end for receiving the material to be conditioned in the kiln and for passing out the exhaust gases of combustion, a conical feed-heater arranged in the feeding end, its construction including a central passage for exhaust gases, which passage is closed at its inner end and open at its outer end, and also including, around the central passage, a feed passage adapted to cause material entered therein to be conveyed for delivery into the kiln, the outer wall of said feed passage, within the kiln, being in the form of a grate for discharging material into the interior of the kiln and for admitting exhaust gases from the interior of the kiln, and the inner wall between said feed passage and central passage being perforated so that the admitted gases on passing through the moving material will enter the central passage for transit therethrough and discharge from the kiln.

6. In a rotary kiln apparatus, having a feeding end whereto a flow of the exhaust gases is maintained, the combination with a conical perforated conveying drum disposed within the feeding end and connected with the kiln to rotate therewith, the smaller end of said drum being presented at the open feeding end of the kiln, a stationary feed-hopper arranged to feed material into the smaller end of said drum, a swinging gate, supported separately from the kiln, covering the upper portion of the open end of the kiln and regulating the discharge from the hopper into the drum, said parts being arranged to cause the flow of exhaust gases to enter the drum through the lower part thereof and to stream through the material conveyed by the drum, for discharge through apertures of the drum and the unobstructed lower end of the kiln.

7. A rotary kiln apparatus having a feeding end whereto a flow of exhaust gases is maintained, said apparatus comprising a kiln body with a perforated conical enlargement constituting the feeding end of the kiln, said enlargement narrowing toward the body to convey material to the body and the latter having openings through which the conveyed material passes into the interior of the body, a housing with a gas outlet channel encompassing the enlargement and combined with a mantle about that portion of the body containing said openings, and arranged to form a guide channel to direct conveyed material to said openings, a feed tube extending into the housing and arranged to deliver material onto the enlargement, said parts being arranged to permit exhaust gases to stream through the material entering the apertures of the enlargement and openings of the kiln body, to be finally discharged through the gas outlet openings.

8. In combination with a rotary kiln having a feeding end adapted to receive a flow of hot gases from the combustion zone, a drum adapted to feet material into the kiln supported within the kiln and having a perforated wall spaced from the surrounding wall of the kiln, with the material receiving end of the drum presented adjacent the feeding end of the kiln and the discharging end of the drum having position inwardly of the kiln, means for feeding a stream of the material into the receiving end of the drum, means associated with the kiln and drum defining an outlet channel for the gases, said parts being arranged to cause the flow of hot gases to stream through the material feeding from the receiving end to the discharging end of the drum and passing through the perforated wall of the drum, prior to escaping through said outlet channel, and means for regulating the stream of material fed by the feeding means into the drum.

9. In apparatus of the kind described, a feed drum in the feeding end of a kiln which receives the hot gases from the combustion in the kiln, said drum having a perforated periphery and being supported with said periphery spaced from the interior wall of the kiln, and with the material receiving end of the drum presented adjacent the feeding end of the kiln and the discharging end of the drum being positioned inwardly of the kiln, and means associated with the kiln and drum affording an outlet channel for gases, said channel being arranged so that the flow of hot gases will pass through the perforated periphery to contact material feeding from the receiving end to the discharging end of the drum, prior to escaping through said outlet channel.

10. In a rotary kiln having for feeding material thereinto a feeding end through which the hot gases are conveyed from the combustion zone in the course of their exit from the kiln, a cylindrical shell associated with the feeding end of the kiln and located so as to intercept the outgoing gases, said shell being connected with the kiln to rotate therewith and having an apertured circumferential wall to permit passage of the intercepted gases in small streams, means for maintaining a thin stratum-like flow of finely divided material along the wall to and from the apertures to contact and intermingle with the streams of gases, and means associated with the kiln and wall for receiving the streams of spent gases and conveying the same from the kiln.

11. In a rotary kiln having for feeding material thereinto a feeding end through which the hot gases are conveyed from the combustion zone in the course of their exit from the kiln, a cylindrical shell for feeding material to the kiln associated with the feeding end thereof for receiving the conveyed gases, said shell being connected with the kiln for rotation therewith and including an apertured circumferential wall for the transit of the material being fed and to permit the passage of gases to contact and intermingle with the material being fed, means to maintain a continuous regulated flow of material to a point for feeding the same in contact with said circumferential wall, and means associated with the kiln and wall for receiving the spent gases and conveying the same from the kiln.

12. In apparatus of the kind described, a calcining chamber including an outlet end for the discharge of waste gases received from the chamber, a rotating drum associated with the outlet end to intercept the gases but having openings permitting discharge of the same in small streams, means for maintaining a pre-determined amount of finely divided material continuously flowing to the drum for support thereby, said drum extending to a point in said chamber for discharging its material, and operating to guide the material to said point and in contact with the streams of gases.

13. In a kiln including a feeding end for receiving the material to be conditioned in the kiln and for passing out the exhaust gases of combustion, the combination of a rotary drum associated with said feeding end and adapted, when rotated, to feed material into the kiln and having a perforated wall, means for feeding a continuous stream of material to the drum, means for causing the flow of hot gases to stream continuously through the material being fed by the drum and passing through the perforated wall of the drum, and means for regulating the stream of material fed by the feeding means to the drum.

14. In a kiln apparatus including a feeding end for receiving material to be conditioned in the kiln and for passing out the exhaust gases of combustion, a rotary feed heater associated with the feeding end of the kiln and having an inferior passage and a superior passage, the walls of the feed heater which form said passages being perforated to permit the hot gases to stream through the feed heater in the course of their exit, the inferior passage being adapted, on rotation of the feed heater, to cause material entered therein to be moved in a continuous stream for delivery into the kiln.

15. In a kiln apparatus including a feeding end adapted to receive a flow of hot gases from the combustion zone of the kiln, a rotary drum in connection with the feeding end and adapted, when rotated, to feed material into the kiln in a thin rarefied stream with respect to the interior cross dimension of the kiln, said drum having a perforated peripheral wall, means for feeding a stream of material into the drum, means for causing the flow of hot gases to intermingle with the thin rarefied stream and thence move through the material being fed by the drum and passing through the perforated peripheral wall of the drum, and means for regulating the stream of material fed by the feeding means into the drum.

16. In a kiln apparatus, a rotary feed drum therefor, disposed in such manner as to receive the hot combustion gases of the kiln, said drum having a perforated periphery and being adapted, when rotated, to feed into the kiln through the gases a continuous thin rarefied stream of material, and means associated with the kiln and drum to cause the gases to pass through the perforated periphery in the course of their exit.

ARNO ANDREAS.